May 16, 1950     H. J. McALLISTER     2,507,672
VACUUM CLEANER

Filed April 12, 1946     2 Sheets-Sheet 1

Inventor
Harley J. McAllister
By Greek Wells
Atty.

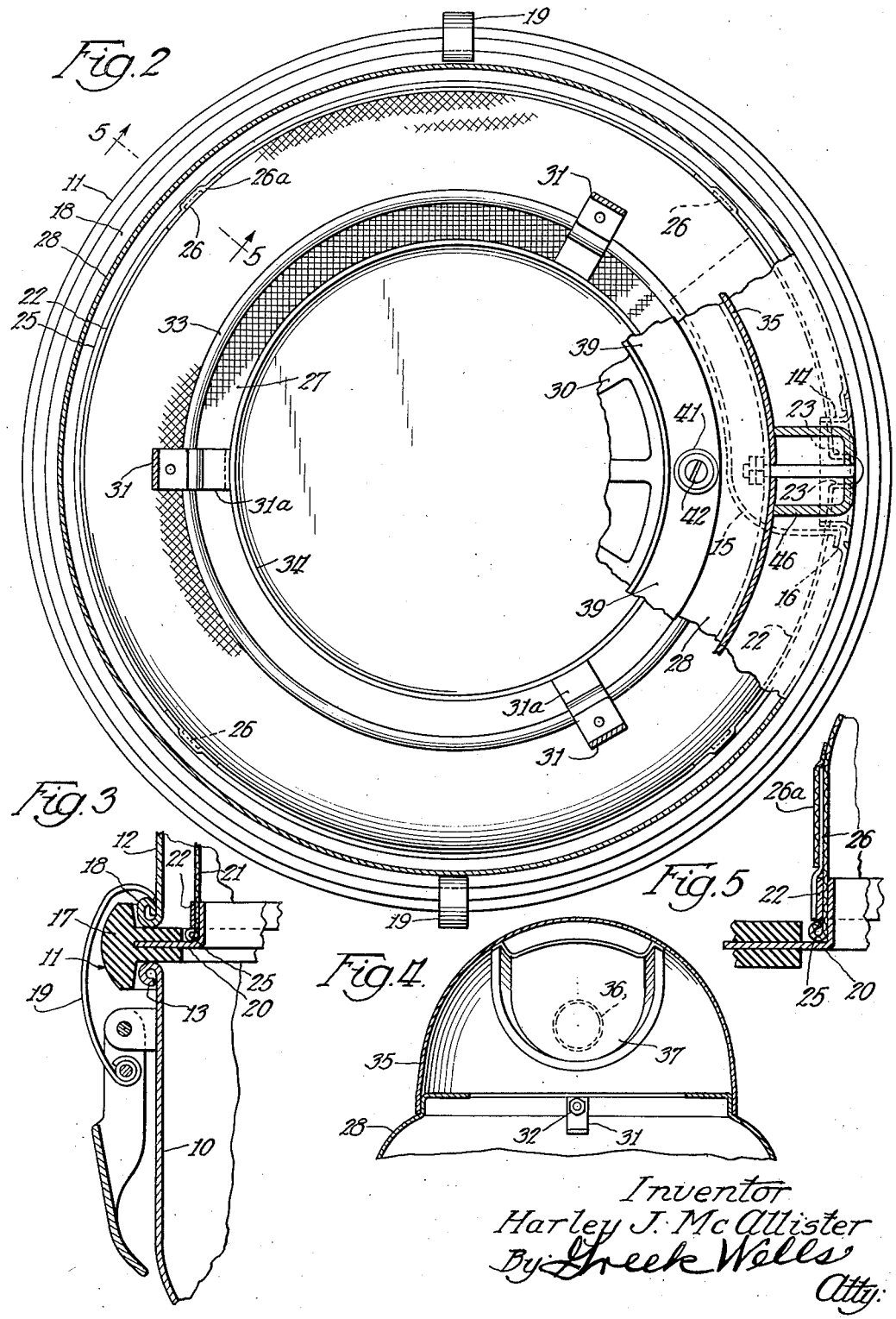

Patented May 16, 1950

2,507,672

UNITED STATES PATENT OFFICE 2,507,672

VACUUM CLEANER

Harley J. McAllister, Wheaton, Ill., assignor to Franklin McAllister Corporation, a corporation of Illinois Application April 12, 1946, Serial No. 661,844

1 Claim. (Cl. 183—37)

The present invention relates to vacuum cleaners, and is particularly directed to improvements in vacuum cleaners of the type shown in my prior application, Serial Number 572,933 (now Patent No. 2,441,365, dated May 11, 1948). In general it is the purpose of this invention to provide a novel combination of three units in a vacuum cleaner, each of which units so performs its own functions as to facilitate and improve the general operation of the cleaner. The units comprise a container adapted to receive any materials picked up by the vacuum cleaner including dirt and liquids, an easily separable filter, air seal, and bumper unit, and an easily separable suction, and handle unit.

In suction cleaners of the type wherein a motor driven fan unit is employed to draw air through a filter unit, the filter unit should have a receptacle beneath it in which the materials picked up by the suction will be deposited. In accordance with my invention, I provide such a pan and the pan is so arranged that it is easily emptied, it requires no additional housing and is so arranged that it utilizes gravity and centrifugal force in catching and retaining any heavier than air matter such as dirt particles or liquids. I have further improved the filter arrangement, and its combination with the suction producing unit whereby to utilize the entire filter surface efficiently without in any way interfering with the capacity of the dust pan to receive and hold the accumulated dirt.

It is also a purpose of this invention to provide certain novel improvements in the assembly of the dust pan filter unit and suction unit whereby the air circulation there through is improved, and the utilization of the air for the purpose of entraining the dirt particles to be picked up and the dual purpose of keeping the motor unit cool are enhanced.

The nature and advantages of my invention will appear more fully from the following description, and the accompanying drawings wherein a preferred form of the invention is shown. It should be understood, however, that the drawings and description are illustrative only, and should not be considered as limiting the invention except insofar as it is limited by the claim.

In the drawings:

Figure 2 is a sectional view taken substantially on the line 2—2 of Figure 1;

Figure 3 is an enlarged fragmentary sectional view taken on the line 3—3 of Figure 1;

Figure 4 is a sectional view taken on the line 4—4 of Figure 1 but with the motor and fan removed; and Figure 5 is an enlarged fragmentary sectional view through a portion of the filter mounting to illustrate how it is fastened in place.

Figure 1:
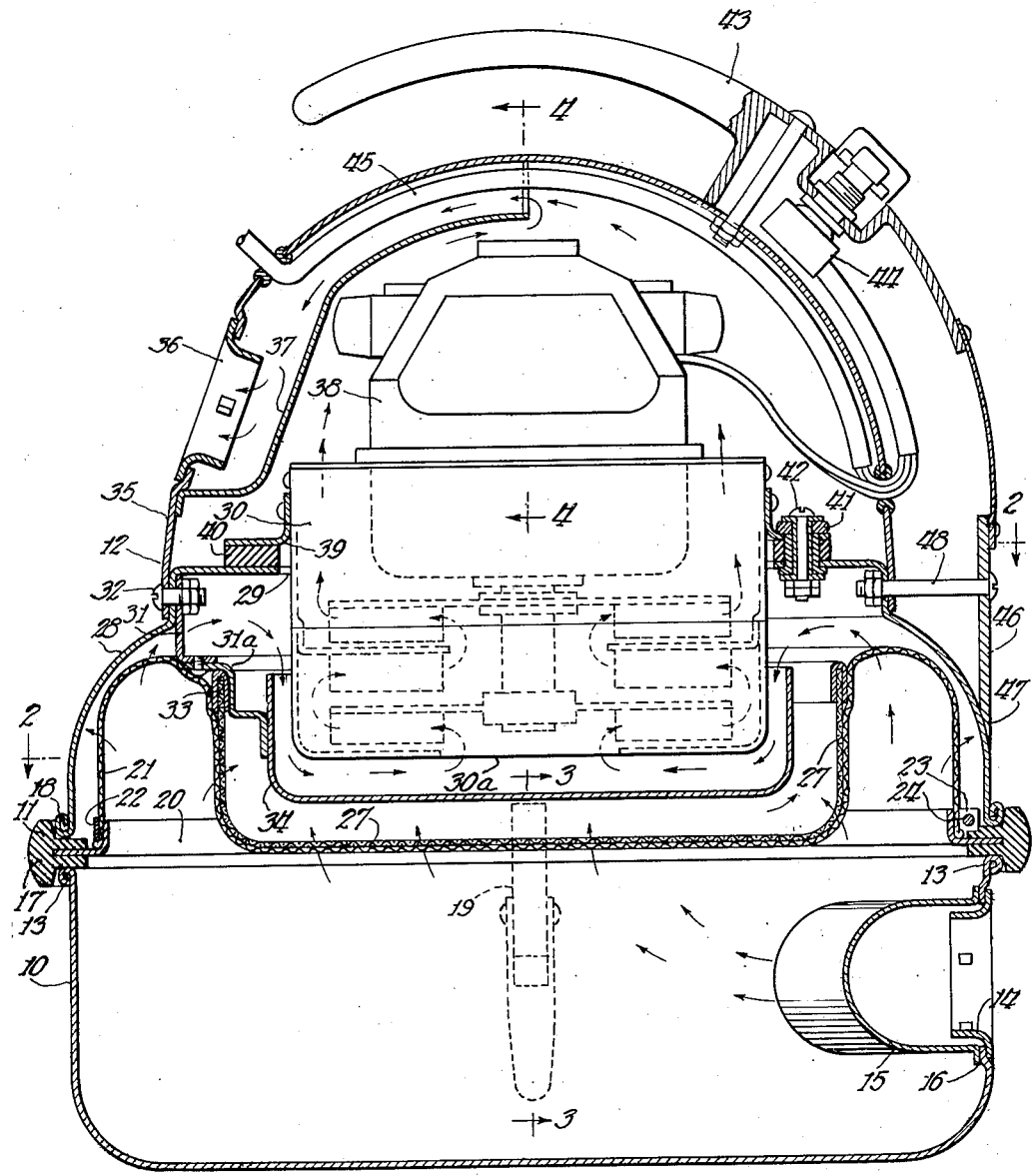
Figure 1 is a vertical sectional view through a vacuum cleaner embodying my invention.

Referring now in detail to the drawings, my invention is embodied in a vacuum cleaner comprising a dust receptacle or pan 10, a combination filter and air seal and bumper unit 11, and a suction cover and handle unit 12. The dust pan 10 comprises a metal pan circular in cross section, which is provided with a beaded rim 13 at the top. This pan has an inlet at 14 which is constructed to receive the usual suction tube employed with this type of vacuum cleaner. Inside the inlet 14 I provide a deflecting tube 15 which is welded to the pan at 16 and extends along the vertical wall of the pan in a horizontal direction, so as to direct the air entering the pan circumferentially about the interior thereof. This whirling movement of the air is particularly advantageous in providing an opportunity for the heavier than air particles to settle out before the air strikes the filter. Likewise it insures spreading of the dirt particles over the entire pan area.

The unit 11 has a bumper 17 which also serves as a seal between the members 10 and 12 so as to prevent air being drawn in along the meeting line between these two members. It will be noted that the member 12 also has a beaded rim 18 at its lower edge which rests on the bumper in the assembly as shown. Suitable clamping means shown at 19 in Figure 3 serve to hold the pan and cover members clamped in position on the bumper and sealing ring 17. This construction is essentially the same as that shown in my prior application.

The ring 17 carries a circular filter mounting ring 20 which has an upstanding flange over which a filter cloth 21 is placed. The cloth is held in place by a clamping band 22, the ends of which are turned out as indicated at 23, and secured together by a bolt 24. In order to adequately secure the filter between the two rings 20 and 22, I provide a bead 25 in the edge of the filter, and this bead is caught below the ring 22 as shown best in Figure 5. The ring 22 also supports a plurality of flat strips or stays 26, which are secured thereto by welding, and which project upwardly into pockets 26a provided around the periphery of the filter. As shown in Figure 2 of the drawings, there are four of these stays and pockets, although the number may be varied within the scope of my invention. The filter unit as shown extends upwardly into the cover member 12, because of the stays 26, and then passes downwardly again and underneath a screen 27 which is supported by the cover member 12.

The member 12 consists of a lower inverted pan shaped unit 28 which has an aperture at 29 through which a fan unit 30 extends down into the space within the screen 27. The screen 27 is carried by a plurality of brackets 31 that are secured to the unit 28 by screw bolts 32. These brackets 31 are made up of two pieces, the lower piece 31a being positioned so as to form a support for the rim 33 of the screen 27. Preferably the rim is welded direct to the portion 31a. In addition the portion 31a carries an air guide cup 34 which extends downwardly into the area within the screen 27, and below the lower surface of the fan unit 30, so as to provide an air guide requiring the air which passes through the filter to diffuse, over the entire filter surface. This provides a more effective use of the filter. The air stream flows up into the unit 28 over the edge of the cup 34, and thence downwardly into the inlet 30a of the fan unit.

A hood 35 fits over the unit 28, and is secured thereto by the screw bolts 32. This hood serves to mount an outlet member 36 for the air, and a shield 37 over the outlet member. The shield extends upwardly substantially to the top of the hood 35, and is shaped as shown in Figure 4 to provide adequate cross section for the passage of the air out of the hood. The air is thus all pushed upwardly to the top of the hood before it can be discharged from the casing. This is particularly useful in cooling the power unit, which comprises a motor 38, because it requires the air to circulate around the motor.

The motor and fan constitute a single unit, which unit is carried by a ring 39 mounted on the fan casing 30. This ring rests on a sealing ring 40, which in turn rests on the unit 28. At spaced intervals the ring 39 is secured to the member 28 by rubber grommets 41 and screw bolts 42. The ring 40 is of a suitable resilient cushioning material such as rubber, which also serves as an insulation to electrically insulate the motor and fan casing from the shell of the vacuum cleaner. The ring 40 and the grommets 41 also insure a yielding support for the power unit, thus eliminating noise and cutting down the vibrations that would otherwise be communicated to the shell of the cleaner. A handle 43 is mounted on the hood 35, and carries a switch element 44 for controlling the supply of current to the motor 38. As shown, the current is carried to the motor through the switch 44 by a conductor 45 entering through the shield 37. The handle 43 has an extended portion 46 that projects down below the level of the hood to rest upon the outwardly bulging portion of the unit 28 at 47. A screw bolt 48 serves to fasten the extended portion 46 to the unit 28.

It is believed that the construction of the vacuum cleaner will be clear from the foregoing description. The advantages thereof lie in the fact that the three part assembly enables the vacuum cleaner to be used with a minimum amount of trouble by the operator. The construction is such that the dust pan itself is entirely available for the collection of the heavier than air matter drawn in by the suction. The suction unit can be picked off the dust pan and filter unit, and set on the floor leaving the filter in position to clean conveniently by shaking the dirt into the pan. Then the dust pan is emptied and cleaned. Furthermore, the construction of the filter unit 21 and the manner of its support together with the screen 27, and the air guide cup 34, insures proper use of the entire filter area for the air passing upwardly through the filter. There is no tendency for certain spots of the filter to be subjected to high pressure differentials which would tend to force fine particles of dust through the filter, thus destroying the filter quickly and limiting the usefulness thereof. As it is constructed, the filter receives air throughout substantially its entire surface. There is a relatively deep well in the filter between the screen 27 and the stays 26, where the air which has the greatest velocity in the dust pan has a chance to rise and lose its velocity. The filter portion over the central part of the dust pan is stretched over the screen 27 so as to receive the air without any hindrance other than the small amount of hindrance due to the screen itself. All of the air must pass up outside the guide cup 34, and then down between the guide cup and the pan unit 30 to reach the suction entrance 30a of the fan. By this construction I am able to obtain a substantially uniform distribution of the air over the filter, and avoid the high pressure spots.

From the foregoing description it is believed that the nature and advantages of my invention will be clear to those skilled in the art.

Having thus described my invention, I claim:
In a vacuum cleaner of the character described, a motor, a suction unit depending therefrom, and open at its lower end, a housing around the motor and suction unit and open at its lower end, a dust pan, a cup shaped screen carried by said housing, a dust separating cloth, a support ring for said cloth secured between the dust pan and the housing supporting the cloth beneath the screen, an imperforate cup-like deflector supported by said housing within the screen and having its open upper end substantially at the level of the open upper end of the said screen and below the level of the motor, the said imperforate cup-like deflector being situated between and spaced from the said screen and the inlet of the suction unit.

HARLEY J. McALLISTER.

REFERENCES CITED

The following references are of record in the file of this patent:

UNITED STATES PATENTS

| Number | Name | Date |
| --- | --- | --- |
| 1,198,968 | Stevens | Sept. 19, 1916 |
| 2,149,135 | Eriksson-Jons | Feb. 28, 1939 |
| 2,296,359 | Martinet | Sept. 22, 1942 |